(12) United States Patent
Kagata

(10) Patent No.: US 12,305,052 B2
(45) Date of Patent: May 20, 2025

(54) INK SET, RECORDING METHOD, AND RECORDING DEVICE

(71) Applicant: SEIKO EPSON CORPORATION, Tokyo (JP)

(72) Inventor: Takayoshi Kagata, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 325 days.

(21) Appl. No.: 18/095,577

(22) Filed: Jan. 11, 2023

(65) Prior Publication Data

US 2023/0220228 A1 Jul. 13, 2023

(30) Foreign Application Priority Data

Jan. 12, 2022 (JP) .................................. 2022-003074

(51) Int. Cl.
*C09D 11/40* (2014.01)
*B41J 2/01* (2006.01)
(Continued)

(52) U.S. Cl.
CPC .................. *C09D 11/40* (2013.01); *B41J 2/01* (2013.01); *B41J 2/1623* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 2002/0054186 A1* | 5/2002 | Hotomi | ................... B41J 2/2107 347/43 |
| 2003/0008113 A1* | 1/2003 | Ohya | ................... B41M 7/0027 428/195.1 |

(Continued)

FOREIGN PATENT DOCUMENTS

JP 2019-001870 A 1/2019

*Primary Examiner* — Manish S Shah
(74) *Attorney, Agent, or Firm* — Harness, Dickey & Pierce, P.L.C.

(57) ABSTRACT

An ink set is an ink set including a cyan ink C1 which has a fluorescent brightening intensity of 3.0 or greater and an SP value of 12 to 18 $(cal/cm^3)^{1/2}$, a magenta ink M1 which has a fluorescent brightening intensity of 3.0 or greater and an SP value of 12 to 18 $(cal/cm^3)^{1/2}$, a yellow ink Y1 which has a fluorescent brightening intensity of 3.0 or greater and an SP value of 12 to 18 $(cal/cm^3)^{1/2}$, a cyan ink C2 which has a fluorescent brightening intensity of less than 3.0 and an SP value of 12 to 18 $(cal/cm^3)^{1/2}$, a magenta ink M2 which has a fluorescent brightening intensity of less than 3.0 and an SP value of 12 to 18 $(cal/cm^3)^{1/2}$, and a yellow ink Y2 which has a fluorescent brightening intensity of less than 3.0 and an SP value of 12 to 18 $(cal/cm^3)^{1/2}$, in which the SP values are values obtained by a turbidity titration method using a mixed solution of water and acetone.

13 Claims, 1 Drawing Sheet

(51) Int. Cl.
*B41J 2/16* (2006.01)
*B41J 2/165* (2006.01)
*B41J 2/21* (2006.01)
*B41M 5/00* (2006.01)
*C09D 11/037* (2014.01)
*C09D 11/322* (2014.01)
*C09D 11/328* (2014.01)
*C09D 11/36* (2014.01)
*C09D 11/38* (2014.01)
*C09D 11/50* (2014.01)

(52) U.S. Cl.
CPC ......... *B41J 2/16517* (2013.01); *B41J 2/2107* (2013.01); *B41M 5/0023* (2013.01); *C09D 11/037* (2013.01); *C09D 11/322* (2013.01); *C09D 11/328* (2013.01); *C09D 11/36* (2013.01); *C09D 11/38* (2013.01); *B41J 2/16526* (2013.01); *C09D 11/50* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2003/0035034 A1* | 2/2003 | Fukumoto | C09D 11/40 347/100 |
| 2003/0106462 A1* | 6/2003 | Yatake | C09D 11/32 106/31.28 |
| 2003/0196570 A1* | 10/2003 | Shen | C09D 11/40 106/31.89 |
| 2003/0234848 A1* | 12/2003 | Ishikawa | C09D 11/101 347/102 |
| 2005/0080153 A1* | 4/2005 | Masumi | C09D 11/101 522/71 |
| 2007/0123600 A1* | 5/2007 | Sasa | C09D 11/101 522/31 |
| 2008/0055379 A1* | 3/2008 | Ishikawa | B41J 11/00214 347/100 |
| 2008/0318331 A1* | 12/2008 | Sens | C07D 209/58 548/426 |
| 2010/0233446 A1* | 9/2010 | Kawashima | C09D 11/30 522/181 |

* cited by examiner

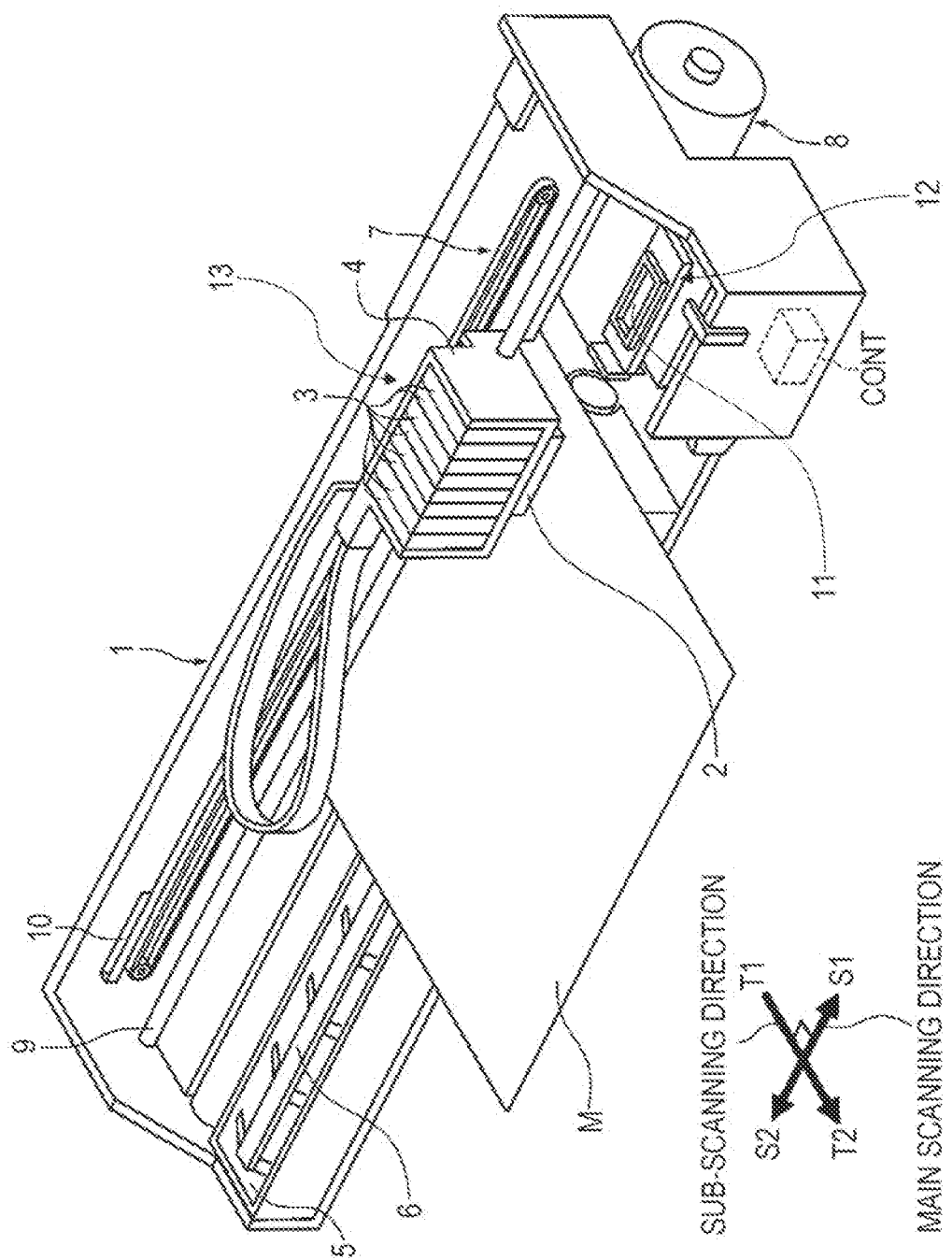

INK SET, RECORDING METHOD, AND RECORDING DEVICE

The present application is based on, and claims priority from JP Application Serial Number 2022-003074, filed Jan. 12, 2022, the disclosure of which is hereby incorporated by reference herein in its entirety.

BACKGROUND

1. Technical Field

The present disclosure relates to an ink set, a recording method, and a recording device.

2. Related Art

An ink jet recording method enables recording of a high-definition image with a relatively simple device and thus has been rapidly developed in various fields. In this circumstance, various research for stably obtaining a high-quality recorded material has been conducted. For example, JP-A-2019-001870 describes an ink set including a predetermined cyan ink and a predetermined yellow ink respectively containing a water-insoluble colorant and a liquid medium selected from water or an organic solvent for the purpose of providing a blue dye with satisfactory light resistance which is used for dyeing various recording media, preferably fibers, and more preferably polyester fibers.

However, JP-A-2019-001870 describes that the cyan ink contains a predetermined colorant with an object of expanding a color reproduction area in ink jet textile printing, but there is no description of the yellow ink containing a predetermined colorant, and thus it cannot be said that expansion of the color reproduction area is sufficiently achieved.

SUMMARY

According to an aspect of the present disclosure, there is provided an ink set including a cyan ink C1 which has a fluorescent brightening intensity of 3.0 or greater and an SP value of 12 to 18 $(cal/cm^3)^{1/2}$, a magenta ink M1 which has a fluorescent brightening intensity of 3.0 or greater and an SP value of 12 to 18 $(cal/cm^3)^{1/2}$, a yellow ink Y1 which has a fluorescent brightening intensity of 3.0 or greater and an SP value of 12 to 18 $(cal/cm^3)^{1/2}$, a cyan ink C2 which has a fluorescent brightening intensity of less than 3.0 and an SP value of 12 to 18 $(cal/cm^3)^{1/2}$, a magenta ink M2 which has a fluorescent brightening intensity of less than 3.0 and an SP value of 12 to 18 $(cal/cm^3)^{1/2}$, and a yellow ink Y2 which has a fluorescent brightening intensity of less than 3.0 and an SP value of 12 to 18 $(cal/cm^3)^{1/2}$, in which the SP values are values obtained by a turbidity titration method using a mixed solution of water and acetone.

Further, according to another aspect of the present disclosure, there is provided a recording method including an ink adhesion step of jetting the ink set described above from an ink jet head to make the ink set adhere to a recording medium, in which in the ink adhesion step, a nozzle opening time is 1 minute or longer, and the nozzle opening time is a time taken to maintain a state where some nozzles are opened during a time period from when the inks are jetted from some nozzles of the ink jet head to when suction cleaning is performed on the some nozzles.

According to still another aspect of the present disclosure, there is provided a recording device including an ink jet head including nozzles for jetting each ink of the ink set described above, and a cleaning unit.

BRIEF DESCRIPTION OF THE DRAWINGS

FIGURE is a schematic view showing a recording device that can be used in the present embodiment.

DESCRIPTION OF EXEMPLARY EMBODIMENTS

Hereinafter, embodiments of the present disclosure (hereinafter, referred to as "present embodiment") will be described in detail with reference to the accompanying drawing as necessary, but the present disclosure is not limited thereto, and various modifications can be made within a range not departing from the scope of the present disclosure. Further, in the drawing, the same elements are denoted by the same reference numerals, and the description thereof will not be repeated. Further, the positional relationships such as up, down, right, and left are based on the positional relationships shown in the drawing unless otherwise specified. In addition, the dimensional ratios in the drawing are not limited to the ratios shown in the drawing.

1. Ink Set

An ink set of the present embodiment is an ink set that includes a cyan ink C1 which has a fluorescent brightening intensity of 3.0 or greater and an SP value of 12 to 18 $(cal/cm^3)^{1/2}$, a magenta ink M1 which has a fluorescent brightening intensity of 3.0 or greater and an SP value of 12 to 18 $(cal/cm^3)^{1/2}$, a yellow ink Y1 which has a fluorescent brightening intensity of 3.0 or greater and an SP value of 12 to 18 $(cal/cm^3)^{1/2}$, a cyan ink C2 which has a fluorescent brightening intensity of less than 3.0 and an SP value of 12 to 18 $(cal/cm^3)^{1/2}$, a magenta ink M2 which has a fluorescent brightening intensity of less than 3.0 and an SP value of 12 to 18 $(cal/cm^3)^{1/2}$, and a yellow ink Y2 which has a fluorescent brightening intensity of less than 3.0 and an SP value of 12 to 18 $(cal/cm^3)^{1/2}$, may further include a black ink B having an SP value of 12 to 18 $(cal/cm^3)^{1/2}$, an orange ink O having an SP value of 12 to 18 $(cal/cm^3)^{1/2}$, and other inks having an SP value of 12 to 18 $(cal/cm^3)^{1/2}$ as necessary, and preferably includes a total of 8 or more kinds of inks, in which the SP values are values obtained by a turbidity titration method using a mixed solution of water and acetone.

Further, in the present embodiment, the fluorescent brightening intensity denotes a numerical value represented by Equation (1) and can be measured by using a spectrophotometer FD-7 (manufactured by Konica Minolta, Inc.).

$$\text{Fluorescent brightening intensity } \Delta B = B(D65) - B(UVcut) \tag{1}$$

(In the equation, B (D65) represents the brightness of a D65 light source, and B (UVcut) represents the brightness of the D65 light source after cutting a wavelength of 410 or less of the D65 light source.) Further, the D65 light source denotes a standard light source defined by the International Commission on Illumination. In addition, it is preferable that the fluorescent brightening intensity of an ink be measured by setting the adhesion amount of the ink to 15 $g/m^2$ or greater in order to avoid the influence of a recording medium. It is more preferable that the fluorescent brightening intensity of an ink be measured by setting the adhesion amount of the ink to 21 $g/m^2$.

Further, the SP value of each ink of the ink set denotes the SP value obtained by a turbidity titration method using a mixed solution of water and acetone, the Hansen SP value of a water-soluble organic solvent denotes the SP value based on a Hansen's method, and the average Hansen SP value of water-soluble organic solvents denotes a weighted average of the Hansen SP values of the water-soluble organic solvents in the inks. Hereinafter, the reason why two kinds of SP values are used in the present embodiment will be described in detail.

Since an ink contains various components, the SP value of the ink is difficult to define using the Hansen's method that estimates the solubility of the ink from the molecular structure of one molecule, and thus it is appropriate to use the SP value obtained by the turbidity titration method. Further, since the SP value obtained by the turbidity titration method is considered to be used to evaluate a state close to a state for evaluation of the dispersion stability of an ink in a state where drying of the ink in a nozzle is promoted and thus the solvent is rich, the SP value obtained by the turbidity titration method is appropriate as the SP value of the ink from the viewpoint of solving the problems.

Further, since the turbidity titration method cannot be used in some cases without causing white turbidity or deposition due to a change in ratio of water to acetone depending on the kind of solvent and the solubility of a water-soluble organic solvent is easily estimated from the molecular structure thereof, the SP value based on the Hansen's method is considered to be appropriately used as the SP value of the water-soluble organic solvent.

Here, the SP value obtained by the turbidity titration method in the present embodiment will be described.

In general, the SP value obtained by the turbidity titration method is a value calculated by adding a poor solvent dropwise to each ink and acquiring the titration amount of the poor solvent required to cause turbidity according to Equation (2) given by K. W. SUH and J. M. CORBETT (see the description in Journal of Applied Polymer Science, 12, 2359, 1968). However, in the present embodiment, since an object to be measured is a colored ink, turbidness is difficult to determine by direct visual observation, and thus the SP value obtained by the turbidity titration method is defined as a value calculated by acquiring the titration amount of the poor solvent required to generate a precipitate of a coloring material in place of the turbidness according to Equation (2) given by K. W. SUH and J. M. CORBETT (see the description in Journal of Applied Polymer Science, 12, 2359, 1968).

In the present specification, the value obtained by the turbidity titration method which is defined as described above will be referred to as the SP value obtained by the turbidity titration method.

Two kinds of poor solvents, a poor solvent 1 with a low SP value and a poor solvent 2 with a high SP value, are used as the poor solvents, but in the present specification, the SP value is measured by the turbidity titration method of each ink by using mixed solutions of water and acetone with different mixed ratios as a poor solvent 1 and a poor solvent 2.

$$SP\text{value}=(V_{ml}^{1/2}\cdot\delta_{ml}+V_{mh}^{1/2}\cdot\delta_{mh})/(V_{ml}^{1/2}+V_{mh}^{1/2}) \quad (2)$$

Here, each symbol in the calculation equation is as follows.

$$V_{ml}=v_1\times v_2/((1-V_L)\times v_2+V_L\times v_1)$$

$$V_{mh}=v_1\times v_2/((1-V_H)\times v_3+V_H\times v_1)$$

T: Amount of solvent required to dissolve ink components (ml)
L: Titration amount (ml) of poor solvent 1
H: Titration amount (ml) of poor solvent 2

$$V_L=L/(T+L)$$

$$V_H=H/(T+H)$$

$v_1$: Molar molecular volume (cm$^3$/mol) of solvent used to dissolve ink components
$v_2$: Molar molecular volume (cm$^3$/mol) of poor solvent 1
$v_3$: Molar molecular volume (cm$^3$/mol) of poor solvent 2

$$\delta_{ml}=\delta_T\times T/(T+L)+\delta_L\times L/(T+L)$$

$$\delta_{mh}=\delta_T\times T/(T+L)+\delta_H\times L/(T+L)$$

$\delta_T$: SP value of solvent used for dissolving ink components
$\delta_L$: SP value of poor solvent 1
$\delta_H$: SP value of poor solvent 2

Further, the molar molecular volumes (cm$^3$/mol) of acetone and water are respectively 74.4 in the case of acetone and 18 in the case of water, and the SP values of acetone and water (deionized water) are respectively 9.75 in the case of acetone and 23.4 in the case of water.

Further, the SP value obtained by Hansen (referred to as "Hansen SP value") in the present embodiment will be described. The Hansen SP value in the present embodiment is a solubility parameter based on the Hansen's method. The Hansen's method is a method of classifying the SP value δ into three terms and calculating the three terms using an equation of $\delta^2=\delta_d^2+\delta_p^2+\delta_h^2$. The parameters $\delta_d^2$, $\delta_p^2$, and $\delta_h^2$ are solubility parameters corresponding to a dispersion force term, a dipole interaction force term, and a hydrogen bonding force term.

Further, the SP value and the Hansen SP value are in units of (cal/cm$^3$)$^{1/2}$, and the Hansen SP value is a value proposed by Hansen based on an idea that "two substances with similar intermolecular interactions easily dissolve in each other. The SP value and the Hansen SP value can be estimated by calculation and can also be acquired experimentally and experientially, and thus the values are described in various documents in many cases. In the present embodiment, the values derived by using calculation software Hansen-Solubility HSPiP can be used as the Hansen SP value.

The ink in the present embodiment is an ink used by being jetted from an ink jet head by the ink jet method and adhering to a recording medium.

Hereinafter, each ink of the ink set according to the present embodiment will be described in detail.

1.1. Cyan Ink

The cyan ink of the present embodiment includes two kinds of cyan inks C1 and C2 having SP values in predetermined ranges and different fluorescent brightening intensities. When the ink set includes two kinds of cyan inks C1 and C2 with different fluorescent brightening intensities, the color reproduction area expands and the graininess is improved. Further, when the cyan inks C1 and C2 are used, reproducibility of a color tone with high saturation (hereinafter, also referred to as "fluorescent color reproduction area") that is difficult to reproduce with an ink having low fluorescent brightening intensity is further improved, and the light resistance of the cyan ink that is difficult to improve with an ink having low fluorescent brightening intensity can also be improved.

Further, in an ink set in which the number of colors is increased in order to expand the color reproduction area, the state where nozzles are opened without being capped and without jetting the inks is maintained long, and thus the time taken until suction cleaning starts increases due to an increase in size of the ink jet head. Therefore, nozzle clogging is likely to occur and intermittent reliability is degraded. On the contrary, when the SP values are in predetermined ranges, the size of the head increases due to a large number of inks of the ink set, and thus the intermittent reliability can be further improved even in a case where the nozzle opening time is long. Therefore, the storage stability is also improved.

Particularly, when inks of the same color are used, since the ink used for the purpose of expanding the color reproduction area is not frequently used for printing and the jetting amount thereof is small, the intermittent reliability is more likely to be degraded. Accordingly, the present disclosure is particularly useful.

The coloring material contained in the cyan ink is not particularly limited, and examples thereof include a compound represented by Formula (I), C.I. Disperse Blue 3, 5, 6, 7, 9, 14, 16, 19, 20, 24, 26, 26:1, 27, 35, 43, 44, 52, 54, 55, 56, 58, 60, 61, 62, 64, 64:1, 71, 72, 72:1, 73, 75, 77, 77:1, 79, 81, 81:1, 82, 83, 85, 87, 88, 90, 91, 93, 94, 95, 96, 99, 102, 106, 108, 112, 113, 115, 118, 120, 122, 125, 128, 130, 131, 139, 141, 142, 143, 145, 146, 148, 149, 153, 154, 158, 165, 167, 171, 173, 174, 176, 181, 183, 185, 186, 187, 189, 197, 198, 200, 201, 205, 207, 211, 214, 224, 225, 241, 257, 259, 267, 268, 270, 284, 285, 287, 288, 291, 293, 295, 297, 301, 315, 330, 333, 354, 359, 360, and 367, and C.I. Solvent Blue 2, 11, 14, 24, 25, 35, 36, 38, 48, 55, 59, 63, 67, 68, 70, 73, 83, 105, 111, and 132.

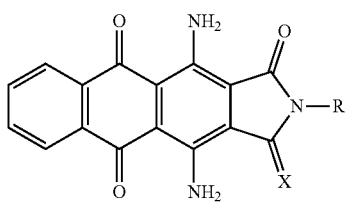

(I)

(In the formula, R represents a hydrogen atom or an alkyl group having 1 to 18 carbon atoms, the hydrogen atom of the alkyl group may be substituted with an alkoxy group having 1 to 6 carbon atoms, and X represents an oxygen atom or an imino group.)

The alkyl group having 1 to 18 carbon atoms as R is not particularly limited, and examples thereof include a linear alkyl group such as a methyl group, an ethyl group, a propyl group, a butyl group, a pentyl group, a hexyl group, an octyl group, a decyl group, or a dodecyl group, a branched alkyl group such as an isopropyl group, an isobutyl group, a tertiary butyl group, a neopentyl group, a 2-hexyl group, a 2-octyl group, a 2-decyl group, or a 2-dodecyl group, and a cyclic alkyl group such as a cyclopropyl group, a cyclobutyl group, a cyclopentyl group, a cyclohexyl group, a cyclooctyl group, a cyclodecyl group, or a cyclododecyl group.

The number of carbon atoms of the alkyl group as R is in a range of 1 to 18, preferably in a range of 2 to 10, and more preferably in a range of 3 to 8.

Further, the hydrogen atom of the alkyl group having 1 to 18 carbon atoms as R may be substituted with an alkoxy group having 1 to 6 carbon atoms. Such a group is not particularly limited, and examples thereof include a group represented by Formula (II).

$$-C_nH_{2n}-O-C_mH_{2m+1} \qquad (II)$$

In Formula (II), n represents 1 to 18, preferably 2 to 10, and more preferably 3 to 8. Further, m represents 1 to 6, preferably 2 to 5, and more preferably 3 or 4.

The cyan ink C1 and the cyan ink C2 may each contain only one or a plurality of coloring materials.

Hereinafter, the cyan ink C1 and the cyan ink C2 will be described in detail.

1.1.1. Cyan Ink C1

The fluorescent brightening intensity of the cyan ink C1 is 3.0 or greater, preferably in a range of 3.0 to 24, more preferably in a range of 3.0 to 18, and still more preferably in a range of 3.0 to 12.

The cyan ink C1 contains preferably at least one of C.I. Disperse Blue 60 or a compound represented by Formula (I) and more preferably a compound represented by Formula (I) as the coloring material. When the cyan ink C1 contains such a coloring material, the color reproduction area and the fluorescent color reproduction area are likely to be further improved, and the graininess is likely to be further improved.

Further, the SP value of the cyan ink C1 is in a range of 12 to 18 $(cal/cm^3)^{1/2}$, preferably in a range of 12 to 16 $(cal/cm^3)^{1/2}$, and more preferably in a range of 12 to 14 $(cal/cm^3)^{1/2}$. When the SP value of the cyan ink C1 is in the above-described ranges, the intermittent reliability and the storage stability are likely to be further improved.

The content of the coloring material contained in the cyan ink C1 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the cyan ink C1 is in the above-described ranges, the color reproduction area and the fluorescent color reproduction area are likely to be further improved, and the graininess is likely to be further improved.

1.1.2. Cyan Ink C2

The fluorescent brightening intensity of the cyan ink C2 is less than 3.0, preferably 0.1 or greater and less than 3.0, and more preferably 0.1 or greater and less than 1.0.

The cyan ink C2 contains preferably at least one of C.I. Disperse Blue 359 or C.I. Disperse Blue 360 as the coloring material. When the cyan ink C2 contains such a coloring material, the color reproduction area and the fluorescent color reproduction area are likely to be further improved, and the graininess is likely to be further improved.

Further, the SP value of the cyan ink C2 is in a range of 12 to 18 $(cal/cm^3)^{1/2}$, preferably in a range of 13 to 17 $(cal/cm^3)^{1/2}$, and more preferably in a range of 14 to 16 $(cal/cm^3)^{1/2}$. When the SP value of the cyan ink C2 is in the above-described ranges, the intermittent reliability and the storage stability are likely to be further improved.

The content of the coloring material contained in the cyan ink C2 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the cyan ink C2 is in the above-described ranges, the color reproduction area and the fluorescent color reproduction area are likely to be further improved, and the graininess is likely to be further improved.

1.2. Magenta Ink

The magenta ink of the present embodiment includes two kinds of magenta inks M1 and M2 having SP values in predetermined ranges and different fluorescent brightening intensities. When the ink set includes two kinds of magenta inks M1 and M2 with different fluorescent brightening intensities, the color reproduction area, the fluorescent color reproduction area, and the graininess are further improved as described above, and the intermittent reliability and the storage stability are also improved.

The coloring material contained in the magenta ink is not particularly limited, and examples thereof include C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328, 362, and 364, C.I. Solvent Red 1, 3, 7, 8, 9, 18, 19, 23, 24, 25, 27, 49, 100, 109, 121, 122, 125, 127, 130, 132, 135, 218, 225, and 230, and C.I. Vat Red 41.

The magenta ink M1 and the magenta ink M2 may each contain only one or a plurality of coloring materials.

Hereinafter, the magenta ink M1 and the magenta ink M2 will be described in detail.

1.2.1. Magenta Ink M1

The fluorescent brightening intensity of the magenta ink M1 is 3.0 or greater, preferably in a range of 3.0 to 24, more preferably in a range of 3.0 to 18, and still more preferably in a range of 3.0 to 12.

The magenta ink M1 contains at least one coloring material, and preferably at least one of C.I. Disperse Red 364, C.I. Disperse Red 362, or C.I. Vat Red 41 and more preferably C.I. Disperse Red 364 as such a coloring material. When the magenta ink M1 contains such a coloring material, the color reproduction area and the fluorescent color reproduction area are likely to be further improved, and the graininess is likely to be further improved.

Further, the SP value of the magenta ink M1 is in a range of 12 to 18 $(cal/cm^3)^{1/2}$, preferably in a range of 12 to 16 $(cal/cm^3)^{1/2}$, and more preferably in a range of 12 to 14 $(cal/cm^3)^{1/2}$. When the SP value of the magenta ink M1 is in the above-described ranges, the intermittent reliability and the storage stability are likely to be further improved.

The content of the coloring material contained in the magenta ink M1 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the magenta ink M1 is in the above-described ranges, the color reproduction area and the fluorescent color reproduction area are likely to be further improved, and the graininess is likely to be further improved.

1.2.2. Magenta Ink M2

The fluorescent brightening intensity of the magenta ink M2 is less than 3.0, preferably 0.1 or greater and less than 3.0, and more preferably 0.1 or greater and less than 1.0.

The magenta ink M2 contains at least one coloring material, and preferably C.I. Disperse Red 60 as such a coloring material. When the magenta ink M2 contains such a coloring material, the color reproduction area and the fluorescent color reproduction area are likely to be further improved, and the graininess is likely to be further improved.

Further, the SP value of the magenta ink M2 is in a range of 12 to 18 $(cal/cm^3)^{1/2}$, preferably in a range of 14 to 18 $(cal/cm^3)^{1/2}$, and more preferably in a range of 15 to 17 $(cal/cm^3)^{1/2}$. When the SP value of the magenta ink M2 is in the above-described ranges, the intermittent reliability and the storage stability are likely to be further improved.

The content of the coloring material contained in the magenta ink M2 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the magenta ink M2 is in the above-described ranges, the color reproduction area and the fluorescent color reproduction area are likely to be further improved, and the graininess is likely to be further improved.

1.3. Yellow Ink

The yellow ink of the present embodiment includes two kinds of yellow inks Y1 and Y2 having SP values in predetermined ranges and different fluorescent brightening intensities. When the ink set includes two kinds of yellow inks Y1 and Y2 with different fluorescent brightening intensities, the color reproduction area, the fluorescent color reproduction area, and the graininess are further improved as described above, and the intermittent reliability and the storage stability are also improved.

The coloring material contained in the yellow ink is not particularly limited, and examples thereof include C.I. Disperse Yellow 1, 3, 4, 5, 7, 8, 9, 13, 16, 23, 24, 30, 31, 33, 34, 39, 41, 42, 44, 49, 50, 51, 54, 56, 58, 60, 61, 63, 64, 66, 68, 71, 74, 76, 77, 78, 79, 82, 83, 85, 86, 88, 90, 91, 93, 98, 99, 100, 104, 108, 114, 116, 118, 119, 122, 124, 126, 135, 140, 141, 149, 153, 160, 162, 163, 164, 165, 179, 180, 182, 183, 184, 186, 192, 198, 199, 201, 202, 204, 210, 211, 215, 216, 218, 224, 227, 231, 232, 233, and 245, and C.I. Solvent Yellow 2, 6, 14, 16, 21, 25, 29, 30, 33, 51, 56, 77, 80, 88, 89, 93, 112, 113, 114, 116, 136, 150, 155, 157, 160, 163, 176, 179, and 199.

The yellow ink Y1 and the yellow ink Y2 may each contain only one or a plurality of coloring materials.

Hereinafter, the yellow ink Y1 and the yellow ink Y2 will be described in detail.

1.3.1. Yellow Ink Y1

The fluorescent brightening intensity of the yellow ink Y1 is 3.0 or greater, preferably in a range of 3.0 to 24, more preferably in a range of 3.0 to 18, and still more preferably in a range of 3.0 to 12.

The yellow ink Y1 contains at least one coloring material, and preferably at least one of C.I. Disperse Yellow 82, C.I. Disperse Yellow 184, C.I. Disperse Yellow 232, or C.I. Solvent Yellow 160 and more preferably at least one of C.I. Disperse Yellow 82 or C.I. Disperse Yellow 232 as such a coloring material. When the yellow ink Y1 contains such a coloring material, the color reproduction area and the fluorescent color reproduction area are likely to be further improved, and the graininess is likely to be further improved.

Further, the SP value of the yellow ink Y1 is in a range of 12 to 18 $(cal/cm^3)^{1/2}$, preferably in a range of 14 to 18 $(cal/cm^3)^{1/2}$, and more preferably in a range of 15 to 17 $(cal/cm^3)^{1/2}$. When the SP value of the yellow ink Y1 is in the above-described ranges, the intermittent reliability and the storage stability are likely to be further improved.

The content of the coloring material contained in the yellow ink Y1 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the yellow ink Y1 is in the above-described ranges, the color reproduction area and the fluorescent color reproduction area are likely to be further improved, and the graininess is likely to be further improved.

1.3.2. Yellow Ink Y2

The fluorescent brightening intensity of the yellow ink Y2 is less than 3.0, preferably 0.1 or greater and less than 3.0, and more preferably 0.1 or greater and less than 1.0.

The yellow ink Y2 contains at least one coloring material and preferably at least one of C.I. Disperse Yellow 54 or C.I. Disperse Yellow 114 as such a colorant. When the yellow ink Y2 contains such a coloring material, the color reproduction area and the fluorescent color reproduction area are likely to be further improved, and the graininess is likely to be further improved.

Further, the SP value of the yellow ink Y2 is in a range of 12 to 18 $(cal/cm^3)^{1/2}$, preferably in a range of 12 to 16 $(cal/cm^3)^{1/2}$, and more preferably in a range of 12 to 14 $(cal/cm^3)^{1/2}$. When the SP value of the yellow ink Y2 is in the above-described ranges, the intermittent reliability and the storage stability are likely to be further improved.

The content of the coloring material contained in the yellow ink Y2 is preferably in a range of 1.0% to 10% by mass, more preferably in a range of 2.0% to 8.0% by mass, and still more preferably in a range of 4.0% to 6.0% by mass with respect to the total amount of the ink. When the content of the coloring material contained in the yellow ink Y2 is in the above-described ranges, the color reproduction area and the fluorescent color reproduction area are likely to be further improved, and the graininess is likely to be further improved.

1.4. Black Ink B

It is preferable that the ink set according to the present embodiment further include a black ink B. The black ink B contains at least one coloring material, such a coloring material is not particularly limited, and examples thereof include C.I. Disperse Black 1, 3, 10, and 24. Further, the coloring material may be prepared by mixing the colors of a cyan ink, a magenta ink, and a yellow ink in the ink set at a predetermined ratio. When the ink includes such a black ink B, the color reproduction area and the fluorescent color reproduction area are likely to expand, and the graininess is likely to be improved.

Further, the SP value of the black ink B is preferably in a range of 12 to 18 $(cal/cm^3)^{1/2}$, more preferably in a range of 14 to 18 $(cal/cm^3)^{1/2}$, and still more preferably in a range of 16 to 18 $(cal/cm^3)^{1/2}$. When the SP value of the black ink B is in the above-described ranges, the intermittent reliability and the storage stability are likely to be further improved even in a case where the number of inks is increased.

The content of the coloring material contained in the black ink B is preferably in a range of 1.0% to 10% by mass, more preferably in a range of 2.0% to 8.0% by mass, and still more preferably in a range of 4.0% to 6.0% by mass with respect to the total amount of the black ink B. When the content of the coloring material contained in the black ink B is in the above-described ranges, an image with satisfactory color developability that contributes to expansion of the color reproduction area, expansion of the fluorescent color reproduction area, and improvement of the graininess is likely to be formed.

1.5. Orange Ink O

It is preferable that the ink set of the present embodiment further include an orange ink O. The orange ink O contains at least one coloring material, such a coloring material is not particularly limited, and examples thereof include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 60, 61, 66, 71, 73, 76, 78, 80, 89, 90, 91, 93, 96, 97, 119, 127, 130, 139, and 142. When the ink set includes such an orange ink O, the color reproduction area and the fluorescent color reproduction area are likely to expand, and the graininess is likely to be further improved.

Further, the SP value of the orange ink O is preferably in a range of 12 to 18 $(cal/cm^3)^{1/2}$, more preferably in a range of 13 to 17 $(cal/cm^3)^{1/2}$, and still more preferably in a range of 14 to 16 $(cal/cm^3)^{1/2}$. When the SP value of the orange ink O is in the above-described ranges, the intermittent reliability and the storage stability are likely to be further improved even in a case where the number of inks is increased.

The content of the coloring material contained in the orange ink O is preferably in a range of 1.0% to 10% by mass, more preferably in a range of 2.0% to 8.0% by mass, and still more preferably in a range of 4.0% to 6.0% by mass with respect to the total amount of the orange ink O. When the content of the coloring material contained in the orange ink O is in the above-described ranges, an image with satisfactory color developability that contributes to expansion of the color reproduction area, expansion of the fluorescent color reproduction area, and improvement of the graininess is likely to be formed.

1.6. Other Inks

It is preferable that the ink set of the present embodiment include other inks as necessary. The other inks contain at least one coloring material, such a coloring material is not particularly limited, and examples thereof include C.I. Disperse Green 9, and C.I. Disperse Brown 1, 2, 4, 9, 13, and 19.

Further, the SP value of the other inks is preferably in a range of 12 to 18 $(cal/cm^3)^{1/2}$. When the SP value of the other inks is in the above-described ranges, the intermittent reliability and the storage stability are likely to be further improved even in a case where the number of inks is increased.

The content of the coloring material contained in the other inks is preferably in a range of 1.0% to 10% by mass, more preferably in a range of 2.0% to 8.0% by mass, and still more preferably in a range of 4.0% to 6.0% by mass with respect to the total amount of the other inks. When the content of the coloring material is in the above-described ranges, an image with satisfactory color developability that contributes to expansion of the color reproduction area, expansion of the fluorescent color reproduction area, and improvement of the graininess is likely to be formed.

1.7. Water-Soluble Organic Solvent

Each ink of the ink set according to the present embodiment may contain a water-soluble organic solvent. The water-soluble organic solvent is not particularly limited, and examples thereof include polyols including glycols such as 1,2-pentanediol, glycerin, ethylene glycol, diethylene glycol, triethylene glycol, polyethylene glycol, propylene glycol, dipropylene glycol, triethylene glycol (methyl triglycol), triethylene glycol monomethyl ether, triethylene glycol monobutyl ether, dipropylene glycol monopropyl ether tripropylene glycol, polypropylene glycol, polyoxyethylene polyoxypropylene glycol, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol, and lactams such as 2-pyrrolidone, N-methyl-2-pyrrolidone, ε-caprolactam, and hydroxyethylpyrrolidone.

The content of the water-soluble organic solvent contained in each ink is preferably 10% by mass or greater, more preferably 12% by mass or greater, still more preferably in a range of 13% to 35% by mass, even still more preferably in a range of 14% to 30% by mass, and even still more preferably in a range of 15% to 25% by mass with respect to the total mass of each ink. When the content of the water-soluble organic solvent is in the above-described ranges, the intermittent reliability and the storage stability are likely to be further improved.

Further, it is preferable to use a water-soluble organic solvent A having a Hansen SP value of 12 $(cal/cm^3)^{1/2}$ or greater and a water-soluble organic solvent B having a Hansen SP value of less than 12 $(cal/cm^3)^{1/2}$ as the water-soluble organic solvent.

The content of the water-soluble organic solvent A is preferably in a range of 7.5% to 30% by mass, more preferably in a range of 10% to 25% by mass, and still more preferably in a range of 12.5% to 20% by mass with respect to the total amount of each ink.

Further, the content of the water-soluble organic solvent B is preferably in a range of 1.0% to 9.0% by mass, more preferably in a range of 2.0% to 8.0% by mass, and still more preferably in a range of 3.0% to 7.0% by mass with respect to the total amount of each ink.

The ratio of the content of the water-soluble organic solvent A to the content of the water-soluble organic solvent B is preferably in a range of 1.0 to 6.0, more preferably in a range of 1.5 to 5.0, and still more preferably in a range of 2.0 to 4.0.

When the contents of the water-soluble organic solvents A and B are in the above-described ranges, the intermittent reliability and the storage stability are likely to be further improved.

Further, it is preferable to use water-soluble organic solvents having a Hansen SP value of 15 $(cal/cm^3)^{1/2}$ as the water-soluble organic solvent. The contents of the water-soluble organic solvents having a Hansen SP value of 15 $(cal/cm^3)^{1/2}$ or greater are respectively preferably 5% by mass or greater, more preferably in a range of 6% to 15% by mass, and still more preferably in a range of 7% to 12.5% by mass with respect to the total amount of each ink.

1.8. Surfactant

Each ink of the present embodiment may further contain a surfactant. The surfactant is not particularly limited, and examples thereof include a silicone-based surfactant, an acetylene glycol-based surfactant, and a fluorine-based surfactant. Among these, a silicone-based surfactant having high surface activity and low foaming properties is preferable.

Examples of the silicone-based surfactant include a polysiloxane-based compound and polyether-modified organosiloxane. The silicone-based surfactant may be used alone or in a combination of two or more kinds thereof.

The acetylene glycol-based surfactant is not particularly limited, and preferred examples thereof include one or more selected from an alkylene oxide adduct of 2,4,7,9-tetramethyl-5-decyne-4,7-diol and 2,4,7,9-tetramethyl-5-decyne-4,7-diol and an alkylene oxide adduct of 2,4-dimethyl-5-decyne-4-ol and 2,4-dimethyl-5-decyne-4-ol. The acetylene glycol-based surfactant may be used alone or in a combination of two or more kinds thereof.

The fluorine-based surfactant is not particularly limited, and examples thereof include a perfluoroalkyl sulfonate, a perfluoroalkyl carboxylate, perfluoroalkyl phosphoric acid ester, a perfluoroalkyl ethylene oxide adduct, perfluoroalkyl betaine, and a perfluoroalkylamine oxide compound. The fluorine-based surfactant may be used alone or in a combination of two or more kinds thereof.

The content of the surfactant is preferably in a range of 0.1% to 3.0% by mass, more preferably in a range of 0.2% to 2.0% by mass, and still more preferably in a range of 0.3% to 1.0% by mass with respect to the total amount of each ink. When the content of the surfactant is in the above-described ranges, the intermittent reliability is likely to be improved.

1.9. Other Components

Each of the inks of the present embodiment may contain one or two or more kinds of optional components that can be used in ink jet ink of the related art, in addition to the above-described components. Specific examples of such optional components include a dissolution assistant, a viscosity adjuster, a pH adjuster, an antioxidant, a preservative, a fungicide, a corrosion inhibitor, a chelating agent for capturing metal ions that affect dispersion, other additives, and solvents other than the above-described solvents. These components may be used alone or in a combination of two or more kinds thereof.

2. Recording Method

A recording method of the present embodiment is a method including an ink adhesion step of jetting the ink jet ink described above from an ink jet head to make the ink adhere to a recording medium, in which in the ink adhesion step, a nozzle opening time is 1 minute or longer, and the nozzle opening time is a time taken to maintain a state where some nozzles are opened during a time period from when the ink is jetted from some nozzles of the ink jet head to when suction cleaning is performed on the some nozzles. Further, the recording method of the present embodiment may further include a transport step and other steps as necessary.

2.1. Ink Adhesion Step

In the ink adhesion step, the ink is jetted from the ink jet head and adheres to a recording medium. More specifically, a pressure generation unit provided in the ink jet head is driven so that the ink filling a pressure generation chamber of the ink jet head is jetted from the nozzle. Such a jetting method is also referred to as an ink jet method.

Examples of the ink jet head used in the ink adhesion step include a line head that performs recording using a line system and a serial head that performs recording using a serial system.

In the line system using a line head, for example, an ink jet head having a width greater than or equal to a recording width of a recording medium is fixed to the recording medium. Further, the recording medium is allowed to move in a sub-scanning direction (transport direction of the recording medium), and ink droplets are jetted from the nozzle of the ink jet head by interlocking the movement of the recording medium to record an image on the recording medium.

In the serial system using a serial head, for example, an ink jet head is mounted on a carriage that is movable in a width direction of a recording medium. Further, the carriage is allowed to move in the main-scanning direction (width direction of the recording medium), and ink droplets are jetted from the nozzle of the ink jet head by interlocking with the movement of the carriage to record an image on the recording medium.

In the ink adhesion step of the present embodiment, the nozzle opening time which is a time taken to maintain the state where some nozzles are opened during a time period from when the inks are jetted from some nozzles of the ink jet head to when suction cleaning is performed on the some nozzles is 1 minute or longer. Therefore, the present disclosure is particularly useful even when the number of inks of the ink set is increased and the nozzle opening time is 1 minute or longer.

2.2. Transport Step

In the transport step, the recording medium is transported in a predetermined direction inside a recording device. More specifically, the recording medium is transported from a paper feed unit to a paper discharge unit of the recording device using a transport roller or a transport belt provided in the recording device. In the transport process, the ink jetted from the ink jet head adheres to the recording medium to form a recorded material. The transport may be performed continuously or intermittently.

2.3. Recording Medium

The recording medium used in the present embodiment is not particularly limited, and examples thereof include an absorbing recording medium and a non-absorbing medium. Among these, since an absorbing recording medium is likely to cause a problem of curling or the like, the present disclosure is effective from the viewpoint that clogging recoverability is excellent while using inorganic oxide particles.

The absorbing recording medium is not particularly limited, and examples thereof include plain paper such as electrophotographic paper with high permeability of ink jet ink, and art paper, coated paper, and cast paper used for typical offset printing with relatively low permeability of an ink from among ink jet paper (paper used exclusively for ink jet which includes an ink absorbing layer formed of silica particles or alumina particles or an ink absorbing layer formed of a hydrophilic polymer such as polyvinyl alcohol (PVA) or polyvinylpyrrolidone (PVP)).

The non-absorbing medium is not particularly limited, and examples thereof include films or plates made of plastics such as polyvinyl chloride, polyethylene, polypropylene, polyethylene terephthalate (PET), polycarbonate, polystyrene, and polyurethane, plates made of metals such as iron, silver, copper, and aluminum, metal plates in which such various metals are produced by vapor deposition, plastic films, plates of alloys such as stainless steel or brass, and recording media obtained by bonding (coating) films made of plastics such as polyvinyl chloride, polyethylene, polypropylene, polyethylene terephthalate (PET), polycarbonate, polystyrene, and polyurethane to base materials made of paper.

3. Recording Device

A recording device according to the present embodiment includes an ink jet head having nozzles for jetting ink jet ink to the recording medium, and a cleaning unit that cleans the nozzles of the ink jet head.

FIG. 1s a perspective view showing a serial printer 1 as the recording device which is an example of the present embodiment. As shown in FIGURE, the serial printer 1 includes a recording unit 13, a platen 5, a drying mechanism 6, a transport unit 8, a guide rod 9, a linear encoder 10, a control unit CONT, a cap member 11, and a cleaning unit 12. The transport unit 8 transports a recording medium M, which has been fed to the serial printer, to the recording unit 13 and discharges the recording medium after recording to the outside of the serial printer. Specifically, the transport unit 8 includes a feeding roller and transports the fed recording medium M in a sub-scanning direction T2.

The recording unit 13 includes an ink jet head 2 that jets each ink from an ink cartridge 3 to the recording medium fed from the transport unit 8, a carriage 4 on which the ink jet head 2 and the ink cartridge 3 are mounted, and a carriage movement mechanism 7 that moves the carriage 4 in main scanning directions S1 and S2 of the recording medium M. The ink cartridge is filled with each ink of the ink set described above.

The cleaning unit 12 is capable of performing a moisturizing operation, a flushing operation, a head cleaning operation, and the like. Specifically, the moisturizing operation is an operation of capping the ink jet head 2 with the cap member 11 during operations except for the recording operation to suppress drying of nozzle holes (not shown) of the ink jet head 2. Further, the flushing operation is an operation of preliminarily jetting the ink from nozzle holes of the ink jet head 2 to the cap member 11 to prevent clogging or the like of the nozzle holes. The head cleaning operation is an operation of replacing recording ink and replacement ink with each other in the ink flow path while discharging the ink from each nozzle hole by driving a suction pump (not shown) after the ink jet head 2 is capped with the cap member 11.

EXAMPLES

Hereinafter, the present disclosure will be described in detail with reference to examples and comparative examples. The present disclosure is not limited to the following examples.

1. Preparation of Each Ink of Ink Set

Each component was placed in a container to have the composition listed in Table 1, and the mixture was mixed and stirred with a magnetic stirrer for 2 hours and more sufficiently mixed by performing a dispersion treatment using a beads mill filled with zirconia beads having a diameter of 0.3 mm. The mixture was stirred for 1 hour and filtered using a PTFE membrane filter with a pore diameter of 5.0 µm, thereby obtaining each ink listed in Table 1. The numerical values in Table 1 are in units of % by mass. Ion exchange water was used as water and added to the mixture such that the mass of each ink reached 100% by mass. In Table 1, the average Hansen SP value of the water-soluble organic solvent denotes a weighted average of the Hansen SP values of each water-soluble organic solvent in the ink.

2. Preparation of Ink Set

Each ink set listed in Table 2 was obtained by selecting inks to have the combination listed in Table 2.

TABLE 1

|  |  | Hansen SP value | Cyan ink | | | | | | Magenta ink | |
|---|---|---|---|---|---|---|---|---|---|---|
|  |  |  | C1-1 | C1-2 | C1-3 | C2-1 | C2-2 | C2-3 | M1-1 | M2-1 |
| Coloring material | DB60 |  | 5.0 |  |  |  |  |  |  |  |
|  | Compound A |  |  | 5.0 |  |  |  |  |  |  |
|  | Compound B |  |  |  | 5.0 |  |  |  |  |  |
|  | DB359 |  |  |  |  | 5.0 | 5.0 | 5.0 |  |  |
|  | DB360 |  |  |  |  |  |  |  |  |  |
|  | DR364 |  |  |  |  |  |  |  | 5.0 |  |
|  | DR60 |  |  |  |  |  |  |  |  | 5.0 |
|  | DY82 |  |  |  |  |  |  |  |  |  |

TABLE 1-continued

|  |  |  |  |  |  |  |  |  |  |  |
|---|---|---|---|---|---|---|---|---|---|---|
|  | DY54 |  |  |  |  |  |  |  |  |  |
|  | DY114 |  |  |  |  |  |  |  |  |  |
|  | DO25 |  |  |  |  |  |  |  |  |  |
| Water- | Propylene glycol | 14.2 | 5.0 | 5.0 | 5.0 | 5.0 |  | 12.0 | 5.0 | 5.0 |
| soluble | Glycerin | 16.7 | 10.0 | 10.0 | 10.0 | 10.0 | 10.0 | 3.0 | 10.0 | 10.0 |
| organic | Methyl triglycol | 10.7 | 5.0 | 5.0 | 5.0 | 5.0 |  | 5.0 | 5.0 | 5.0 |
| solvent | TEGmBE | 10.2 |  |  |  |  | 20.0 |  |  |  |
| Surfactant | BYK 348 |  | 5.0 | 5.0 | 5.0 | 5.0 | 5.0 | 5.0 | 5.0 | 5.0 |
| Pure water |  |  | 79.5 | 79.5 | 79.5 | 74.5 | 64.5 | 74.5 | 74.5 | 74.5 |
| Total |  |  | 100 | 100 | 100 | 100 | 100 | 100 | 100 | 100 |
| Fluorescent brightening intensity |  |  | 3.44 | 3.52 | 3.46 | 0.5 | 0.45 | 0.43 | 3.86 | 0.68 |
| SP value obtained by turbidity titration method |  |  | 14 | 12 | 12 | 15 | 10 | 15 | 13 | 16 |
| Hansen SP value of water-soluble organic solvent |  |  | 15 | 15 | 15 | 15 | 12 | 14 | 15 | 15 |

|  |  | Hansen | Yellow ink | | | Black ink | | Orange ink |
|---|---|---|---|---|---|---|---|---|
|  |  | SP value | Y1-1 | Y2-1 | Y2-2 | B1 | B2 | O1 |
| Coloring | DB60 |  |  |  |  |  |  |  |
| material | Compound A |  |  |  |  |  |  |  |
|  | Compound B |  |  |  |  |  |  |  |
|  | DB359 |  |  |  |  | 2.0 |  |  |
|  | DB360 |  |  |  |  |  | 2.0 |  |
|  | DR364 |  |  |  |  |  |  |  |
|  | DR60 |  |  |  |  | 2.0 |  |  |
|  | DY82 |  | 5.0 |  |  |  |  |  |
|  | DY54 |  |  | 5.0 |  | 1.0 | 1.0 |  |
|  | DY114 |  |  |  | 5.0 |  |  |  |
|  | DO25 |  |  |  |  |  | 2.0 | 5.0 |
| Water- | Propylene glycol | 14.2 | 5.0 | 5.0 | 5.0 | 5.0 | 5.0 | 5.0 |
| soluble | Glycerin | 16.7 | 10.0 | 10.0 | 10.0 | 10.0 | 10.0 | 10.0 |
| organic | Methyl triglycol | 10.7 | 5.0 | 5.0 | 5.0 | 5.0 | 5.0 | 5.0 |
| solvent | TEGmBE | 10.2 |  |  |  |  |  |  |
| Surfactant | BYK 348 |  | 5.0 | 5.0 | 5.0 | 5.0 | 5.0 | 5.0 |
| Pure water |  |  | 74.5 | 74.5 | 74.5 | 74.5 | 74.5 | 74.5 |
| Total |  |  | 100 | 100 | 100 | 100 | 100 | 100 |
| Fluorescent brightening intensity |  |  | 3.72 | 0.08 | 0.12 | 0.05 | 0.03 | 0.12 |
| SP value obtained by turbidity titration method |  |  | 16 | 13 | 20 | 18 | 17 | 15 |
| Hansen SP value of water-soluble organic solvent |  |  | 15 | 15 | 15 | 15 | 15 | 15 |

The abbreviations and the components of products used in Table 1 are as follows, <Coloring Material>

DB60: Disperse Blue 60

Compound A: compound represented by Formula ($I_A$) (compound obtained in Production Example 1)

Compound B: compound represented by Formula ($I_B$) (compound obtained in Production Example 2)

DB359: Disperse Blue 359

DB360: Disperse Blue: 360

DR364: Disperse Red 354

DR60: Disperse Red ED

DY82: Disperse Yellow 82

DY54: Disperse Yellow 54

DY114: Disperse Yellow 114

DO25: Disperse Orange 25

<Water-Soluble Organic: Solvent>

Propylene glycol

Glycerin methyl triglycol

TEGmBE: triethylene glycol monobutyl ether

<Surfactant>

BYK348=trade name, "BYK (registered trademark)-348", manufactured by BYK-Chemie Japan (polyether-modified siloxane surfactant)

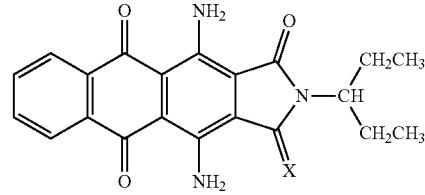

($I_A$)

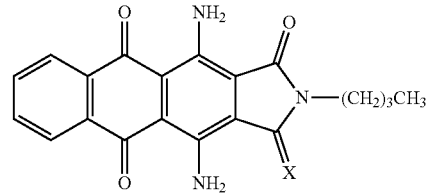

($I_B$)

Production Example 1

A compound represented by Formula ($I_A$) was produced in the following manner.

3 parts of 1,4-diamino-2,3-anthraquinone dicarboximide and 25 parts of 3-aminopentane were added to 75 parts of self lane to obtain a liquid. The obtained liquid was heated in an autoclave at, 140° C., allowed to react for 6 hours, and cooled to room temperature to obtain a liquid. The solid deposited from the obtained liquid was separated by filtration, washed with 100 parts by methanol and 200 parts of water, and dried, thereby obtaining 3.1 parts of a compound represented by Formula ($I_A$).

Production Example 2

A compound represented by Formula ($I_B$) was produced in the following manner.

3.0 parts of 1,4-diamino-2,3-anthraquinone dicarboximide and 25 parts of 1-aminobutane were added to 75 parts of sulfolane to obtain a liquid. The obtained liquid was heated in an autoclave at 140° C., allowed to react for 6 hours, and cooled to room temperature to obtain a liquid. The solid deposited from the obtained liquid was separated by filtration, washed with 100 parts by methanol and 200 parts of water, and dried, thereby obtaining 2.9 parts of a compound represented by Formula (La).

2.1. Measurement of SP Value Using Turbidity Titration Method

The SP value of each ink was measured by the turbidity titration method using mixed solutions of water and acetone with different mixing ratios, 2.2. Measurement of Fluorescent Brightening Intensity B (D65) and B (UVcut) were measured using a spectrophotometer FD-7 (manufactured by Konica Minolta, Inc.), and the fluorescent brightening intensity was acquired by the following equation. Further, the D65 light source denotes a standard light source defined by the International commission on Illumination.

$$\text{Fluorescent brightening intensity } \Delta B = B(D65) - B(UVCut) \quad (1)$$

(In the equation, B(D65) represents the brightness of the DES light source, and E(UVcut), represents the brightness of the D65 light source after cutting a wavelength of 410 nm or less of the D66 light source.)

3 Evaluation Method 3.1. Color Reproduction Area

A color chart was output by performing recording an TRANSJET Classic (manufactured by Cham Paper) serving as an intermediate transfer medium at a resolution of 1440× 720 dpi with an adhesion amount of 21 g/m² using an ink jet printer SureColor SC-F7000 (manufactured by Seiko Epson Corporation). Thereafter, the ink adhesion side of the intermediate transfer medium was brought into close contact with textile (polyester 100%, Amina, manufactured by Toray industries, Inc.) serving as a white recording medium, heated under conditions of 200° C. for 60 seconds using a heat press machine (TP-608M, manufactured by Taiyo Seiki Co., Ltd.), and subjected to sublimation transfer, thereby Obtaining each dyed product. The L* value, the a* value, and the b* value of the obtained reference color chart image were: measured using a colorimeter (trade name, "FD-7", manufactured by Konica Minolta, Inc.). The value (gamut value 1) of the L*a*b* color reproduction area volume of each ink set was calculated, and the color reproduction area was evaluated according to the following evaluation criteria.

Evaluation Criteria

A: The gamut value 1 was 400000 or greater.
B: The gamut value 1 was 350000 or greater and less than 400000.
C: The gamut value 1 was 300000 or greater and less than 350000, D: The gamut value 1 was 250000 or greater and less than 300000,
E: The gamut value 1 was less than 2.50000.

3.2. Fluorescent Color Reproduction Area

Each dyed product was obtained by the same method a the method for the evaluation test of the color reproduction area described above. The L* value, the a* value, the b* value, and the fluorescent brightening intensity of the obtained reference color chart image were measured using a colorimeter (trade name, "FD-7", manufactured by Konica Minolta, Inc.). The value (gamut value 2) of the L*a*b* color reproduction area volume was calculated by plotting the points where the fluorescent brightening intensity was 0.3 or greater, and the fluorescent color reproduction area was evaluated according to the following evaluation criteria.

Evaluation Criteria

A: The gamut value 2 was 200000 or greater.
B: The gamut value 2 was 150000 or greater and less than 200000.
C: The gamut value 2 was 100000 or greater and less than 150000.
D: The gamut value: 2 was 50000 or greater and less than 100000.
E: The gamut value 2 was less than 50000.

3.3. Graininess

Each dyed product was obtained by the same method as the method far the evaluation test, of the color reproduction area described above. The duty of the secondary color was changed to 10% to 100%, and the graininess was visually evaluated according to the following evaluation criteria.

Evaluation Criteria

A: The granular feeling was not found.
B: The granular feeling was slightly found.
C: The granular feeling was clearly found.

3.4. Intermittent Reliability

An ink jet printer (trade name, SC-F10050H, manufactured by Seiko Epson Corporation) was filled with each ink and allowed to stand in a state where nozzles were opened for 1 minute, Thereafter, the number of slip-out nozzles when the inks were jetted without performing cleaning with a cleaning unit was counted, and the intermittent reliability was evaluated according to the evaluation criteria.

Evaluation Criteria

A: The number of slip-out nozzles was 0.
B: The number of slip-out nozzles was in a range: of 1 to 5.
C: The number of slip-out nozzles was 6 or greater.

3.5. Storage Stability

The inks were: allowed to stand for one week under a condition of 70° C., and the initial viscosity and the viscosity after the standing for one week were measured. Further, the storage stability was evaluated according to the following evaluation criteria.

Evaluation Criteria

A: change in viscosity was ±5% or less.
B: A change in viscosity was greater than ±5% and 10% or lass.
C: A change in viscosity was greater than ±10% and 15% or less.

4. Evaluation Results

TABLE 2

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Cyan ink C1 | C1-1 | C1-1 | C1-1 | C1-2 | C1-3 |  | C1-1 | C1-1 | C1-1 |  |
| Cyan ink C2 | C2-1 | C2-1 | C2-1 | C2-1 | C2-1 | C2-1 | C2-1 | C2-2 | C2-1 | C2-1 |
| Magenta ink M1 | M1-1 | M1-1 | M1-1 | M1-1 | M1-1 | M1-1 |  | M1-1 | M1-1 |  |
| Magenta ink M2 | M2-1 | M2-1 | M2-1 | M2-1 | M2-1 | M2-1 | M2-1 | M2-1 | M2-1 | M2-1 |
| Yellow ink Y1 | Y1-1 | Y1-1 | Y1-1 | Y1-1 | Y1-1 | Y1-1 | Y1-1 | Y1-1 | Y1-1 |  |
| Yellow ink Y2 | Y2-1 | Y2-1 | Y2-1 | Y2-1 | Y2-1 | Y2-1 | Y2-1 | Y2-1 | Y2-1 | Y2-1 |
| Black ink B | B1 | B1 | B2 | B1 | B1 | B1 | B1 | B1 | B1 | B1 |
| Orange ink O | O1 |  | O1 | O1 | O1 |  |  | O1 | O1 |  |
| Total number of inks | 8 | 7 | 8 | 8 | 8 | 6 | 6 | 8 | 8 | 4 |
| Color reproduction area | B | C | B | A | A | D | D | B | B | E |
| Fluorsecent color reproduction area | B | B | B | A | A | C | C | B | B | E |
| Graininess | A | A | A | A | A | B | B | A | A | C |
| Intermittent reliability | B | A | A | A | B | A | A | B | C | A |
| Storage stability | A | A | A | A | A | A | A | C | A | A |

Based on the comparison between. Examples 1 to 5 and Comparative Examples 1 to 5, it was found that the ink sat according to the present embodiment was excellent in the color reproduction area, the fluorescent color reproduction area, the graininess, the intermittent reliability, and the storage stability as compared with the ink sets of Comparative Examples 1 to 5 that did not satisfy the configuration requirements of the ink composition

What is claimed is:

1. An ink set comprising:
   a cyan ink C1 which has a fluorescent brightening intensity of 3.0 or grater and an SP value of 12 to 18 $(cal/cm^3)^{1/2}$;
   a magenta ink M1 which has a fluorescent brightening intensity of 3.0 or greater and an SP value of 12 to 18 $(cal/cm^3)^{1/2}$;
   a yellow ink Y1 which has a fluorescent brightening intensity of 3.0 or greater and an SP value of 12 to 18 $(cal/cm^3)^{1/2}$;
   a cyan ink C2 which has a fluor went brightening intensity of less than 3.0 and an EP value of 12 to 18 $(cal/cm^3)^{1/2}$;
   a magenta ink M2 which has a fluorescent brightening intensity of less than 3.0 and an SP value of 12 to 18 $(cal/cm^3)^{1/2}$; and
   a yellow ink Y2 which has a fluorescent brightening intensity of less than 3.0 and an SP value of 12 to 18 $(cal/cm^3)^{1/2}$,
   wherein the SP values are values obtained by a turbidity titration method using a mixed solution of water and acetone.

2. The ink set according to claim 1,
   wherein the SP value of the cyan ink C1 is in a range of 12 to 14 $(cal/cm^3)^{1/2}$,
   the SP value of the magenta ink M1 is in a range of 12 to 14 $(cal/cm^3)^{1/2}$,
   the SP value of the yellow ink Y1 is in a range of 15 to 17 $(cal/cm^3)^{1/2}$,
   the SP value of the cyan ink C2 is in a range of 14 to 16 $(cal/cm^3)^{1/2}$,
   the SP value of the magenta ink M2 is in a range of 15 to 17 $(cal/cm^3)^{1/2}$, and
   the SP value of the yellow ink Y2 is in a range of 12 to 14 $(cal/cm^3)^{1/2}$.

3. The ink set according to claim 1,
   wherein the cyan ink C1 contains a compound represented by Formula (I),

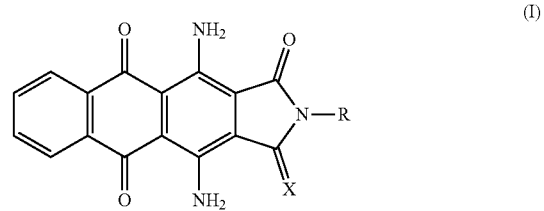

(I)

in the formula, R represents a hydrogen atom or an alkyl group having 1 to 18 carbon atoms, the hydrogen atom of the alkyl group may be substituted with an alkoxy group having 1 to 6 carbon atoms, and X represents an oxygen atom or an imino group.

4. The ink set according to claim 1,
   wherein the yellow ink Y1 contains at least one of Disperse Yellow 232 or Disperse Yellow 82.

5. The ink set according to claim 1,
   wherein the magenta ink M1 contains Disperse Red 364.

6. The ink set according to claim 1, further comprising:
   a black ink B in which the SP value obtained by the turbidity titration method is in a range of 12 to 1.8 $(cal/cm^3)^{1/2}$.

7. The ink set according to claim 1, further comprising
   an orange ink O in which the SP value obtained by the turbidity titration method is in a range of 12 to 18 $(cal/cm^3)^{1/2}$.

8. The ink Bat according to claim 1,
   wherein the ink set includes a total of 8 or more kinds of inks, and
   the SP values of all the inks obtained by the turbidity titration method are in a range of 12 to 18 $(cal/cm^3)^{1/2}$.

9. The ink set according to claim 1,
   wherein all the inks respectively contain a water-soluble organic solvent, and
   contents of the water-soluble organic solvents are respectively 10% by mass or greater with respect to a total amount of each ink.

10. The ink set according to claim 9,
    wherein the contents of the water-soluble organic solvents in the cyan ink C1, the magenta ink M1, and the yellow ink Y1 are respectively 12% by mass or greater with respect to the total amount of each ink.

11. The ink set according to claim 9,
wherein all the inks respectively contain a water-soluble organic solvent, and
the contents of the water-soluble organic solvents having an average Hansen SP value of 15 $(cal/cm^3)^{1/2}$ or greater are respectively 5% by mass or greater with respect to the total amount of each ink.

12. A recording method comprising:
an ink adhesion step of jetting the ink set according to claim 1 from an ink jet head to make the ink set adhere to a recording medium,
wherein in the ink adhesion step, a nozzle opening time is 1 minute or longer, and
the nozzle opening time is a time taken to maintain a state where some nozzles are opened during a time period from when the inks are jetted from some nozzles of the ink jet head to when suction cleaning is performed on the some nozzles.

13. A recording device comprising:
an ink let head including nozzles for jetting each ink of the ink set according to claim 1; and
a cleaning unit.

* * * * *